April 21, 1936. M. J. KITTLER 2,038,223
CARBURETOR VALVE
Filed March 4, 1935
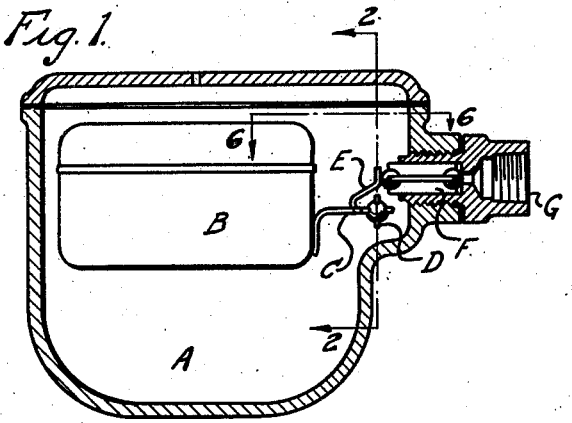
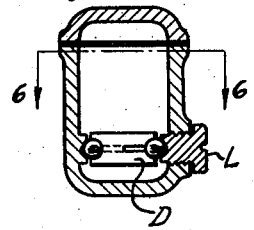
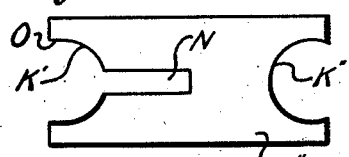
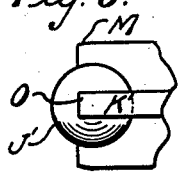
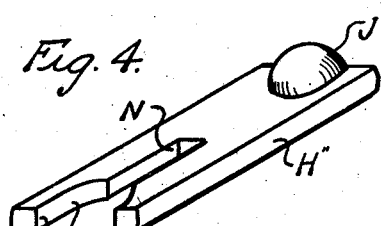
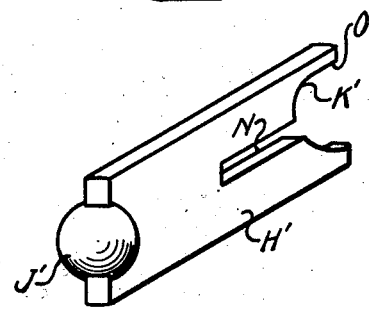
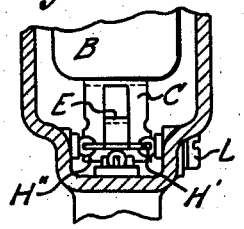
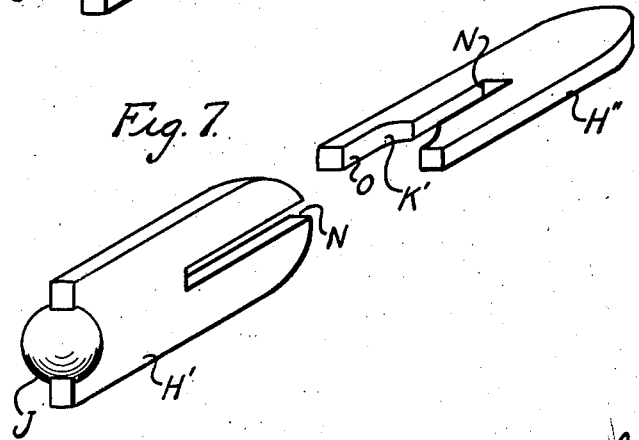
INVENTOR
MILTON J. KITTLER
BY
ATTORNEY Patented Apr. 21, 1936

2,038,223

UNITED STATES PATENT OFFICE 2,038,223

CARBURETOR VALVE

Milton J. Kittler, Detroit, Mich., assignor to Milton E. Chandler, Detroit, Mich.

Application March 4, 1935, Serial No. 9,141

11 Claims. (Cl. 251—159)

The object of this invention is to produce a combination float valve and guide therefor of novel design that would have advantages over the type of valve and guide now in use.

In the invention disclosed herewith I propose to use standard steel balls which are commercially made very accurate and which are very cheap to obtain. The novelty in this invention is in the means of assembling and holding these balls so that the ball at one end forms the shut-off valve and the ball at the other end is the bearing against the float lever. The balls are held in place by means of two simple rectangular stampings. One end is formed so that the ball can be inserted laterally from the side and cannot be pulled out. In the other end the ball can be inserted longitudinally from the end. Two steel pieces are made exactly alike each having a slot in the center into which one piece can dovetail. When they are pushed together it is only necessary to peen in the ends that were normally straight to form a sufficient curvature to grasp the ball and prevent the assembly from pulling apart. I thus obtain a float valve made of two identical very simple stampings and two commercial balls. The resulting valve is both superior in wearing quality to the standard needle and can be manufactured much more cheaply.

The fact that these two balls can rotate in every direction insures that the wear takes place uniformly over the whole surface of the balls. With the orthodox needle construction the wear on the seat takes place over a narrow annulus which eventually becomes a groove and leaks, whereas with a freely rotatable ball the seat automatically changes so that the life of the seat on the valve is increased. The fixed seat against which the valve rests has for the same reason a longer life as the groove which forms on the seat of the orthodox needle eventually destroys the fixed seat in the carburetor.

A steel ball gives an infinite number of seats equal to that of a ground steel seat at much less expense. On the other end of the valve the float lever contacts with a hard seat which does not wear appreciably and offers an infinite number of contact points to resist wear.

Figure 1 shows the preferred form of my invention.

Figure 2 shows a cross-sectional elevation taken on plane 2—2 of Figure 1.

Figure 3 shows the detail of one of the parts.

Figure 4 shows a disassembled view of the principal part of my invention.

Figure 5 shows a detail of the end view.

Figure 6 shows a plan view on plane 6—6 of Figure 1.

Figure 7 shows a disassembled view of a modification of my invention.

In the figures, A is the float chamber, B is the float mounted therein, C is the float lever, D is the pivoted support for the float, E is the arm of the float lever engaging with float valve F. This float valve F is shown disassembled in Figure 4 consisting of two similar parts H' and H''. Slots N—N therein enable these two parts to be locked together at right angles to each other. Two balls J' and J'' are mounted in the ends of the pieces H' and H''. The semi-circular openings K'—K'' are provided in the pieces H' and H''. The openings K' and K' are simple semi-circular openings with parallel portions tangential to the semi-circle as shown in O so that when the balls J' and J'' are in place there is a slight extension beyond so that the ends of H' and H'' may be peened over the balls so as to lock the balls in place. The other end is given an opening K'' greater than 180° so that when the balls are put in place they are held in positively without peening. It thus follows that when the two pieces H' and H'' are slid together by means of the slots N—N and the balls assembled in the openings K'' then the semi-circular opening K' slides over the balls J' and J''. Finally the parallel ends O—O which extend beyond the openings K' and K' are peened over so as to lock the balls J' and J'' in place and at the same time lock the two rectangular pieces H' and H'' together.

The assembly of the pivot D takes place in the same manner. However, the float lever C—E is made integral with piece H'' of the assembly D. The plug L enables the pivot D to be assembled in the carburetor body A.

The chief object of the invention however is the construction of the float valve F.

Figure 7 differs from Figure 4 only in that one ball is used instead of two.

What I claim is:

1. A carburetor float valve comprising two rectangular pieces of steel having slightly greater than a semi-circular opening in the ends thereof, a central slot in each rectangular piece extending from one of the openings, two balls adapted to be embraced by the openings, said rectangular pieces being adapted to be assembled by means of said slots and to be locked together by means of the balls in said openings.

2. A float valve for a carburetor comprising two balls, guide means for supporting said balls comprising two rectangular pieces interlocked at right angles to each other, each piece being adapted to embrace so as to retain both of said balls in said rectangular pieces.

3. A float valve for a carburetor comprising a ball, guide means for said ball comprising two rectangular pieces interlocked at right angles to each other, each piece being adapted to embrace so as to retain said ball in said rectangular pieces.

4. A carburetor float valve comprising two similar rectangular pieces, each piece having slightly greater than a semi-circular opening in each end thereof, a central slot communicating with one of said openings in each rectangular piece so that the two rectangular pieces may be locked together at right angles to each other, two balls, one of which is adapted to fit into each opening in said rectangular pieces, said balls being locked in place by the openings.

5. A float valve for a carburetor comprising a ball, a rectangular piece having a circular opening in the end thereof greater than a semi-circle, a second rectangular piece having a semi-circular opening in the end thereof, a ball adapted to be embraced by both of said openings when said rectangular pieces are assembled at right angles to each other, the opening in this second rectangular piece being distorted so as to lock the ball in place.

6. A float valve for a carburetor comprising two balls, guide means for supporting said balls so as to be freely rotatable comprising two rectangular pieces interlocked at right angles to each other, each piece being adapted to embrace both of said balls, the arcs of contact therewith being slightly over 180°.

7. A float valve for controlling fluid flow comprising two freely rotatable balls, guide means connecting said balls adapted to guide both balls in a straight line to permit flow of fluid around said guide, said guide means embracing said balls so as to retain them in place in said guide means.

8. A valve formed of two rectangular pieces locked together and adapted to embrace so as to retain a ball at one end thereof in said rectangular pieces.

9. A valve formed of two rectangular pieces locked together and adapted to embrace so as to retain a ball at each end thereof, in said rectangular pieces.

10. A carburetor float valve comprising two rectangular pieces having one end rounded, an opening in one end of each piece slightly greater than a semi-circle, a central slot in one piece extending from the opening, a similar slot in the other piece extending from the rounded end opposite to that having the opening, a ball adapted to be embraced by both of the openings, said rectangular pieces being assembled together by means of said slots, locking means for holding the said balls in the openings, said locking means also serving to lock the two rectangular pieces together.

11. A carburetor float valve comprising two similar rectangular pieces having one end rounded, each piece having slightly greater than a semi-circular opening in one end, a central slot communicating with one of said openings in one of said rectangular pieces, a similar slot in the other piece extending from the rounded end opposite to that having the opening, a ball adapted to be embraced by both of the openings, said rectangular pieces being assembled together by means of said slots, said balls being locked in place by the openings.

MILTON J. KITTLER.